United States Patent
Schwiegel et al.

(10) Patent No.: US 8,245,512 B2
(45) Date of Patent: Aug. 21, 2012

(54) WORKING FLUID COMPRISING A FLUORINATED KETONE FOR AN ORC PROCESS, AND ORC APPARATUS

(75) Inventors: Martin Schwiegel, Cologne (DE); Felix Flohr, Hildesheim (DE); Christoph Meurer, Hannover (DE)

(73) Assignee: SOLVAY FLUOR GmbH, Hannover (DE)

( * ) Notice: Subject to any disclaimer, the term of this patent is extended or adjusted under 35 U.S.C. 154(b) by 0 days.

(21) Appl. No.: 13/046,254

(22) Filed: Mar. 11, 2011

(65) Prior Publication Data

US 2011/0162366 A1 Jul. 7, 2011

Related U.S. Application Data

(62) Division of application No. 12/066,018, filed as application No. PCT/EP2006/066488 on Sep. 19, 2006, now abandoned.

(60) Provisional application No. 60/790,738, filed on Apr. 10, 2006.

(30) Foreign Application Priority Data

Sep. 19, 2005 (EP) ..................................... 05019969

(51) Int. Cl.
*F01K 25/00* (2006.01)

(52) U.S. Cl. ................ 60/671; 60/650; 60/651; 60/670; 252/67; 510/412

(58) Field of Classification Search ............ 60/650, 60/651, 670, 671; 252/67; 510/412
See application file for complete search history.

(56) References Cited

U.S. PATENT DOCUMENTS

| | | | |
|---|---|---|---|
| 3,584,457 A | 6/1971 | Davoud | |
| 4,224,795 A | 9/1980 | Stiel | |
| 4,459,810 A | 7/1984 | Enjo et al. | |
| 4,651,531 A * | 3/1987 | Enjo et al. | ........................ 60/651 |
| 4,876,855 A | 10/1989 | Yogev et al. | |
| 5,210,106 A | 5/1993 | Dams et al. | |
| 5,298,083 A | 3/1994 | Van Der Puy et al. | |
| 5,376,359 A | 12/1994 | Johnson | |
| 5,696,307 A | 12/1997 | Van Der Puy et al. | |
| 5,817,708 A | 10/1998 | Congelio et al. | |
| 5,993,682 A | 11/1999 | Tapscott et al. | |
| 6,101,813 A | 8/2000 | Sami et al. | |
| 6,313,083 B1 | 11/2001 | Flynn et al. | |
| 6,423,673 B1 | 7/2002 | Owens et al. | |
| 6,660,709 B1 | 12/2003 | Dournel et al. | |
| 6,880,344 B2 | 4/2005 | Radcliff et al. | |
| 2003/0134757 A1 | 7/2003 | Milbrath et al. | |
| 2005/0247056 A1 | 11/2005 | Cogswell et al. | |
| 2006/0010872 A1 * | 1/2006 | Singh et al. | ..................... 60/671 |
| 2006/0112693 A1 * | 6/2006 | Sundel | ........................... 60/670 |
| 2006/0116036 A1 | 6/2006 | Sundell | |
| 2008/0157022 A1 * | 7/2008 | Singh et al. | ..................... 252/68 |

FOREIGN PATENT DOCUMENTS

| | | |
|---|---|---|
| EP | 066439 A1 | 12/1982 |
| EP | 0676458 A1 | 10/1995 |
| EP | 1325949 A2 | 7/2003 |
| JP | 63/308084 A | 12/1988 |
| JP | 08/020553 A | 1/1996 |
| WO | 02/38718 * | 5/2002 |
| WO | WO 02/38718 A2 | 5/2002 |
| WO | WO 2005/078046 A1 | 8/2005 |
| WO | WO 2005/085398 A2 | 9/2005 |
| WO | WO 2006/014609 A2 | 2/2006 |

* cited by examiner

*Primary Examiner* — Charles Boyer
(74) *Attorney, Agent, or Firm* — Beatrice C. Ortego

(57) ABSTRACT

Use of working fluids for energy conversion in a thermal Organic Rankine Cycle (ORC) process for combined generation of electrical and heat energy. The heat source used in the ORC process is in particular thermal water. The working fluids used in the ORC process are partially or perfluorinated hydrocarbons and/or partially or perfluorinated polyethers and/or partially or perfluorinated ketones. In some embodiments, the working fluid used is a combination of 1,1,1,3,3-pentafluorobutane and a fluorinated polyether having a molecular weight of 340 and a boiling point of 57° C. at 101.3 kPa, or a combination of 1,1,1,3,3-pentafluorobutane and at least one partially or perfluorinated ketone.

11 Claims, 1 Drawing Sheet

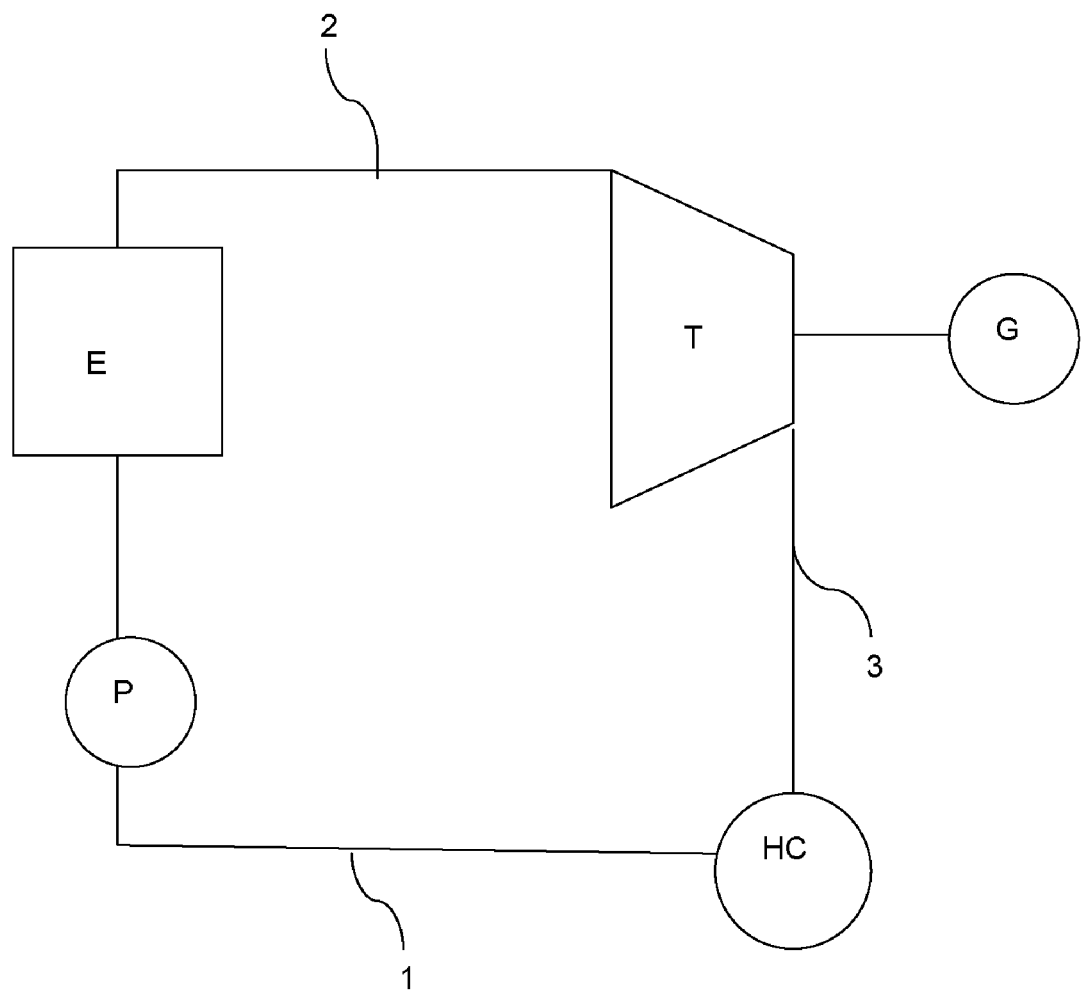

WORKING FLUID COMPRISING A FLUORINATED KETONE FOR AN ORC PROCESS, AND ORC APPARATUS

CROSS-REFERENCE TO RELATED APPLICATIONS

This present application is a divisional application of U.S. application Ser. No. 12/066,018 which is a national stage entry of International Application No. PCT/EP2006/66488, filed on Sep. 19, 2006, which itself claims benefit to European Application No. 05019969.4, filed on Sep. 19, 2005 and to U.S. Provisional Application No. 60/790,738, filed on Apr. 10, 2006, the whole content of these applications being herein incorporated by reference for all purposes.

TECHNICAL FIELD

The invention relates to working fluids for an ORC process for energy conversion in a thermal cycle process for combined generation of electrical and heat energy, to an ORC process and to an apparatus for performing an ORC process.

BACKGROUND

The ORC (organic Rankine cycle) process is a thermodynamic cycle named after William Rankine. ORC installations convert thermal energy into electric current. In a thermal ORC process, selection of the appropriate working fluids allows temperature differences to be bridged and utilized. Such plants are utilized for the electrical energy generation from the waste heat of plants for glass production, cement furnaces, steel furnaces and other processes with waste heat of a temperature greater than 150° C. The utilization of geothermal heat, solar heat or the waste heat from the incineration of waste, biomass and other liquid or solid fuels, or combined operation of gas turbines and waste heat utilization, is likewise possible by means of an ORC process.

Geothermal heat can either be utilized directly or be converted to electrical energy. The conversion of the geothermal heat to electrical energy is becoming ever more significant. Typically, steam-powered processes operated with an organic working fluid (ORC working fluid) are used here. Such a system with an organic working fluid is composed of the main components of evaporator, turbine, condenser and feed pump, and the accompanying control and regulation elements. The working fluid is selected such that its thermodynamic properties are adjusted to the heat source present. Preference is given to using working fluids which evaporate at comparatively low temperatures.

The geothermal heat is utilized as a heat source in the form of hot thermal water with a temperature of, for example, approx. 180° C. Thermal water with a lower temperature is likewise utilizable as a heat source, in which case a working fluid with appropriately low evaporation temperature has to be selected.

The working fluid is preheated by the heat source, then superheated and finally decompressed in a turbine and, as this is done, via a shaft, drives a generator for electricity generation. Subsequently, the working fluid is condensed and compressed again by means of the feed pump and recycled into the preheater.

In order to guarantee economically viable operation, particular requirements are made on the working fluid. In particular, the working fluids are selected taking account of the heat content of the heat source.

The working fluid should be non-toxic and not have any ozone-depleting potential. Moreover, it should as far as possible not be combustible and also have a still appropriately low pressure at high temperatures. The working fluid should have a high thermal and chemical stability. Since working fluids are used in closed circuits which typically consist of metallic components, the question of reactivity and of corrosion behavior toward the metals used is likewise an important aspect in the selection of the working fluids.

To limit the capital costs for the turbines, the use of working fluids with high molecular weight has been found to be advantageous. Owing to their relatively low speed, the utilizable kinetic energy of heavy molecules can largely be dissipated with one turbine blade ring or only a few turbine blade rings at maximum turbine speed. In the case of lighter and hence more mobile fluids, in the acquisition, either more expensive larger turbines or two-stage turbines are required to achieve high rotational speeds, or additional gears have to be incorporated.

Examples of suitable working fluids which have already been used include hydrocarbons such as pentane, or halogenated hydrocarbons such as trifluoromethane, tetrafluoromethane, pentafluoropropane (EP 0 066 439, U.S. Pat. No. 6,880,344). A significant disadvantage in the case of use of pure hydrocarbons is their explosiveness.

SUMMARY

It is an object of the invention to provide a working fluid for energy recovery, especially for utilization of heat sources having a temperature up to approx. 200° C., preferably up to approx. 180° C., which satisfies the requirements mentioned.

It is another object of the invention to provide a method for energy recovery, especially for utilization of heat sources having a temperature up to approx. 200° C., preferably up to approx. 180° C., which satisfies the requirements mentioned.

Still another subject of the present invention is to provide an apparatus for performing an ORC process.

These and other objects of the present invention are achieved by virtue of the working fluid comprising at least one compound selected from the group of the partially or perfluorinated hydrocarbons such as tetrafluoroethane, especially 1,1,1,2-tetrafluoroethane, pentafluoropropane, especially 1,1,1,3,3-pentafluoropropane, hexafluoropropane, heptafluoropropane, especially 1,1,1,2,3,3,3-heptafluoropropane, pentafluorobutane, especially 1,1,1,3,3-pentafluorobutane, hexafluorobutane, heptafluorobutane, decafluoropentane, perfluoropentane, perfluorohexane or mixtures thereof, and/or at least one compound from the group of the partially or perfluorinated polyethers and/or of the partially or perfluorinated ketones; by a ORC process for energy recovery, preferably for utilization of heat sources having a temperature up to approx. 200° C., preferably up to approx. 180° C., in which a working fluid comprising at least one compound selected from the group of the partially or perfluorinated hydrocarbons such as tetrafluoroethane, especially 1,1,1,2-tetrafluoroethane, pentafluoropropane, especially 1,1,1,3,3-pentafluoropropane, hexafluoropropane, heptafluoropropane, especially 1,1,1,2,3,3,3-heptafluoropropane, pentafluorobutane, especially 1,1,1,3,3-pentafluorobutane, hexafluorobutane, heptafluorobutane, decafluoropentane, perfluoropentane, perfluorohexane or mixtures thereof, and/or at least one compound from the group of the partially or perfluorinated polyethers and/or of the partially or perfluorinated ketones is applied; and by the apparatus comprising the ORC working fluid according to the present invention.

BRIEF DESCRIPTION OF THE DRAWING

For a detailed description of the invention, reference will now be made to the accompanying drawing in which:

FIG. 1 gives a sketch of an apparatus according to the invention.

DETAILED DESCRIPTION

In the following, the ORC working fluids are described in detail. The preferred embodiments of the ORC working fluids as described in detail below are also preferred embodiments of the ORC process in which they are applied, and of the apparatus in which they are comprised.

Mixtures of the fluorinated hydrocarbons mentioned above, with the fluorinated polyethers and/or ketones mentioned above may likewise be used as the working fluid for an ORC process and are preferred as working fluids according to the present invention. The inventive working fluid is selected from the multitude of suitable compounds or mixtures of these compounds such that the boiling point of the working fluid used is below the temperature of the heat source, so that the evaporation of the working fluid is possible without any great technical complexity. The composition of the mixtures is preferably selected such that an azeotropic or virtually azeotropic mixture is formed.

The working fluid used is stable within the temperature range of interest and has good thermodynamic properties.

Suitable perfluorinated polyethers are described, for example, in WO 02/38718. These perfluorinated polyethers consist essentially of carbon, fluorine and oxygen atoms and comprise at least two, preferably three, C—O—C ether linkages, or a mixture of several compounds satisfying that definition. Often, the oxygen atoms in the perfluoropolyether are exclusively present within the C—O—C ether linkages. The perfluoropolyethers generally have a molecular weight of about 200 or more. Generally they have a molecular weight of less than about 1500. If the polyether is a mixture of several substances, the molecular weight is the weight-average molecular weight. Generally, the perfluoropolyether has a boiling point greater than or equal to 40° C. at 101.3 kPa. The perfluoropolyether generally has a boiling point less or equal to about 200° C. at 101.3 kPa. As a result of the preparation, these perfluoropolyethers often are a mixture of individual substances.

Generally, the kinematic viscosity of the perfluoropolyether is less than or equal to 1 cSt (Centistoke) at 25° C. Generally, the kinematic viscosity is at least 0.3 cSt at 25° C.

The preferred perfluoro polyethers used are the products marketed by Solvay Solexis under the names GALDEN® and FOMBLIN®.

Examples include:
GALDEN® HT 55: boiling point 57° C. at 101.3 kPa; average molecular weight 340
GALDEN® HT 70: boiling point 66° C. at 101.3 kPa; average molecular weight 410
FOMBLIN® PFS1: boiling point 90° C. at 101.3 kPa; average molecular weight 460

The suitable partially fluorinated polyethers used may be the hydrofluoro ethers marketed by 3M under the name NOVEC®. The GALDEN® and FOMBLIN® systems are usually multicomponent systems having a boiling point in the range from 40 to 76° C.

In a preferred embodiment of the invention, the partially fluorinated hydrocarbons used are especially 1,1,1,3,3-pentafluorobutane (HFC-365mfc), 1,1,1,2-tetrafluoroethane (HFC 134a), 1,1,1,3,3-pentafluoropropane (HFC 245fa) or their mixtures with one another.

The partially or perfluorinated polyethers used are preferably GALDEN® HT 55, GALDEN® HT 70.

Mixtures of the polyethers with the fluorinated hydrocarbons are likewise suitable working fluids in the context of the invention.

The fluorinated ketones used are partially or perfluorinated ketones of the general formula R—C(O)—R' where R and R' are partially or perfluorinated substituents which may be the same or different and are preferably fluorinated alkyl groups. However, R may also be a linear or branched alkyl group. The fluorinated alkyl groups having preferably 1 to 6 carbon atoms may likewise be linear or branched, in which case not more than two fluorine atoms may be replaced by hydrogen. R is preferably perfluoroisopropyl and R' is preferably a trifluoromethyl or pentafluoroethyl group. In one embodiment, the partially fluorinated ketone used is a compound of the abovementioned general formula in which R is a linear or branched alkyl group, preferably a methyl group, and R' is as defined above. Mixtures of the ketones with the fluorinated hydrocarbons are likewise suitable. The preparation of these fluorinated ketones is described in EP 1 261 398. The boiling points of the suitable ketones are within the range from 0° C. to about 150° C., preferably in the range from 0° C. to about 110° C., in particular in the range from 0° C. to about 75° C.

In a preferred embodiment, fluorinated ketones from the group of $CF_3C(O)CF(CF_3)_2$, $CF_3CF_2C(O)CF(CF_3)_2$, $CH_3C(O)CF_2CF_2H$, $CH_3C(O)CF_2CFHCF_3$ are used. In a further preferred embodiment, the ketones are used as a working fluid in combination with partially or perfluorinated hydrocarbons. In particular, mixtures which comprise or consist of HFC-365mfc and at least one compound of the ketones mentioned, preferably $CF_3C(O)CF(CF_3)_2$, are used.

A preferred embodiment concerns mixtures comprising one or more hydrofluorocarbons and one or more (partially and/or per-)fluorinated ethers and/or one or more (partially and/or per-)fluorinated ketones. Especially preferred are such mixtures comprising 1,1,1,3,3-pentafluorobutane (HFC-365mfc) and/or 1,1,1,3,3-pentafluoropropane (HFC 245fa) as hydrofluorocarbons(s).

Compositions described in WO 02/38718 are especially suitable as working fluids according to the present invention.

In the compositions described therein, the weight ratio of the hydrofluoroalkane to the perfluoropolyether is generally greater than or equal to 5:95, often greater than or equal to 10:90, preferably greater than or equal to 25:75. The weight ratio of the hydrofluoroalkane to the perfluoropolyether is generally less than or equal to 95:5, often less than or equal to 90:10, preferably less than or equal to 85:15.

The binary azeotropes or pseudo-azeotropes formed from HFC-365mfc and especially the perfluoropolyethers GALDEN® HT55, GALDEN® HT70 or FOMBLIN® PFS1, which are described in WO 02/38718, are examples for suitable mixtures useful as ORC working fluids according to the present invention.

In a further especially preferred embodiment, the working fluid used is a mixture of HFC-365mfc and GALDEN® HT 55 in a mixing ratio of 65 to 35%.

Mixtures of HFC-365mfc and hydrofluoroethers or HFC-365mfc and perfluorohexane or HFC-365mfc and perfluoropentane or HFC-365mfc and decafluoropentane are likewise preferred working fluids, especially for energy conversion using geothermal water as the heat source. The mixing ratio may be different and, for example, be 50/50, 40/60 or 65/35. Advantageously, the mixing ratio should be selected such that an azeotropic or virtually azeotropic mixture is formed.

The inventive working fluids may especially be used for energy conversion starting from heat sources having a temperature of about 50 to 180° C. They are particularly suitable for conversion of geothermal heat, in the form of thermal water, to electrical energy. Energy conversion utilizing other heat sources, such as solar heat or waste heat from refuse incineration, biomass or other liquid or solid fuels is likewise conceivable. Suitable biomass includes, for example, biomass from plants or feces from animal husbandry.

Likewise, it is possible to convert waste heat, e.g. from industrial processes, according to the present invention. In another embodiment of the present invention, the conversion is performed in an installation or plant for combined heat and power, e.g. in a communal heating/power station.

The working fluids mentioned above are suitable for cooling photo-voltaic cells for increasing the conversion of solar energy. The heat energy absorbed thereby can be utilized for example, according to the present invention, for conversion into additional electric energy. Cooling can be effected here separately, e.g. via a flange-mounted structural element, but as well by direct immersion of the photo-voltaic cells into the working fluid (immersion cooling).

Further, the working fluids according to the present invention can be applied to use heat sources directly in work machines or processing machines, such as, for example, decentralized work or processing machines, especially autarchic pumps in which, for example, solar energy is converted into mechanical energy. The term "decentralized" means in this context especially that the work or processing machine is supplied essentially according to the present invention with energy from a heat source which naturally occurs at the location of the work or processing machine, or which was created artificially for the needs of the work or processing machine.

Combination of a plurality of process stages, for example in the form of secondary cycles, allows the efficiency of the plants to be increased. The working fluids used in the individual secondary cycles may be the same or different. In this case, the waste heat of the individual secondary cycles of the cycle process is sent in each case to the next process or the next stage. In the case of use of different working fluids, the working fluids may be selected such that they have different vapor pressures as a function of the temperature, and the vapor pressures should each be within the optimal range. As a result of such a series connection of secondary circuits, the possibility exists of deriving heat energy, for example for heating purposes, after each stage.

In one embodiment, the thermal water is delivered into the plant with a depth pump. Here, the heat is released to the working fluid in a preheater and an evaporator. The working fluid circulates in a so-called secondary circuit, where, after the pressure increase by the feed pump, it passes through the preheater and the evaporator. The superheated steam is decompressed in the turbine and drives, via a shaft, a generator for electricity generation. The decompression does not proceed above the condensation curve, but rather always remains outside the wet steam range. The decompressed fluid is thus still superheated and this heat must be removed before the working fluid condenses and it is passed back to the preheater. The removed heat can for example be used to heat rooms.

The preferred working fluids, especially a mixture of 60 to 70% by weight, preferably 65% by weight, of HFC-365mfc, and 30 to 40% by weight, preferably 35% by weight, GALDEN® HT55 perfluoropolyethers, are especially suitable for all of the applications described above.

An apparatus, comprising the ORC working fluid according to the present invention, suitable for performing the ORC process of the present invention is also subject of the present invention. Such apparatus in principle are known. They usually comprise means to heat up the ORC working fluid, e.g. an evaporator, optionally a preheater and/or superheater, a turbine which is connected to a generator for producing electrical current, and a heat consumer (condenser) for the ORC working fluid.

FIG. 1 gives a sketch of an apparatus according to the invention. It comprises an evaporator E, a line 1 which is connected to the evaporator and a heat consumer HC via a pump P in which the ORC fluid is compressed. Through line 1, liquid ORC working fluid is transported from the heat consumer HC to the evaporator E. The evaporator E is connected through a line 2 with a turbine T. Through line 2, ORC working fluid is transported in vapor form to the turbine T. Turbine T is connected to a generator G which produces electrical energy. The turbine T is connected to the heat consumer HC via line 3. The vapor leaving the turbine through line 3 is condensed in the heat consumer HC. Evaporator E can be heated by respective heat sources like geothermal water, biomass etc. The apparatus according to the invention comprises one of the above-mentioned ORC working fluids. The heat generated in the heat consumer HC can for example be used for heating rooms.

The invention will be illustrated below using a working example.

EXAMPLE 1

The ORC process starts from an external heat supply via a preheater and an evaporator.

The heat source used was geothermal water having a temperature of 100° C. The fluid, a mixture of HFC-365mfc and GALDEN® HT 55 (mixing ratio 65/35% by weight) evaporates in the evaporator. The fluid vapor passes to a turbine which drives a generator for electricity generation. On the output side, the fluid was conducted into a condenser (heat consumer) and the fluid condensed here was recycled back into the preheater.

What is claimed is:

1. An Organic Rankine Cycle (ORC) process for converting heat into electrical energy, comprising using a working fluid comprising at least one partially fluorinated or perfluorinated hydrocarbon and at least one partially fluorinated or perfluorinated ketone, wherein the at least one partially fluorinated or perfluorinated hydrocarbon is selected from the group consisting of tetrafluoroethane, pentafluoropropane, hexafluoropropane, heptafluoropropane, pentafluorobutane hexafluorobutane heptafluorobutane, perfluoropentane, perfluorohexane, and mixtures thereof.

2. The ORC process according to claim 1, wherein the at least one partially fluorinated or perfluorinated ketone is selected from compounds having the general formula R—C(O)—R', wherein R is an alkyl group, or a linear or branched fluorinated C1-C6-alkyl group in which not more than two fluorine atoms may be replaced by hydrogen, and wherein R' is a linear or branched fluorinated C1-C6 alkyl group in which not more than two fluorine atoms may be replaced by hydrogen.

3. The ORC process according to claim 1, wherein the at least one fluorinated ketone is selected from the group consisting of $CF_3C(O)CF(CF_3)_2$, $CF_3CF_2C(O)CF(CF_3)_2$, $CH_3C(O)CF_2CF_2H$, and $CH_3C(O)CF_2CFHCF_3$.

4. The ORC process according to claim 3, wherein the working fluid comprises a mixture of 1,1,1,3,3-pentafluorobutane and $CF_3C(O)CF(CF_3)_2$.

5. The ORC process according to claim 1, wherein the partially fluorinated or perfluorinated hydrocarbon is at least one compound selected from the group consisting of 1,1,1,2-tetrafluoroethane, 1,1,1,3,3-pentafluoropropane, hexafluoropropane, 1,1,1,2,3,3,3-heptafluoropropane, 1,1,1,3,3-pentafluorobutane, hexafluorobutane, heptafluorobutane, perfluorohexane, and mixtures thereof.

6. An Organic Rankine Cycle (ORC) process for converting heat into electrical energy, said process comprising using a working fluid comprising a mixture of 1,1,1,3,3-pentafluorobutane and at least one partially fluorinated or perfluorinated ketone.

7. The ORC process according to claim 6, wherein the partially fluorinated or perfluorinated ketone is selected from compounds having the general formula R—C(O)—R', where R is a methyl group, or a linear or branched fluorinated C1-C6-alkyl group in which not more than two fluorine atoms may be replaced by hydrogen, and R' is a linear or branched fluorinated C1-C6 alkyl group in which not more than two fluorine atoms may be replaced by hydrogen.

8. The ORC process according to claim 6, wherein said working fluid consists of a mixture of 1,1,1,3,3-pentafluorobutane and at least one partially fluorinated or perfluorinated ketone.

9. An apparatus for performing the ORC process according to claim 1 which comprises the working fluid.

10. The ORC process according to claim 6, wherein the fluorinated ketone is selected from the group consisting of $CF_3C(O)CF(CF_3)_2$, $CF_3CF_2C(O)CF(CF_3)_2$, $CH_3C(O)CF_2CF_2H$, and $CH_3C(O)CF_2CFHCF_3$.

11. An apparatus for performing the ORC process according to claim 6 which comprises the working fluid.

* * * * *